May 23, 1961  F. W. R. STARP  2,985,082
PHOTOGRAPHIC CAMERA
Filed March 14, 1960
2 Sheets-Sheet 1

INVENTOR.
Franz Wilhelm R. Starp
BY
March, Gillette, Virgil & Eslinger
ATTORNEYS

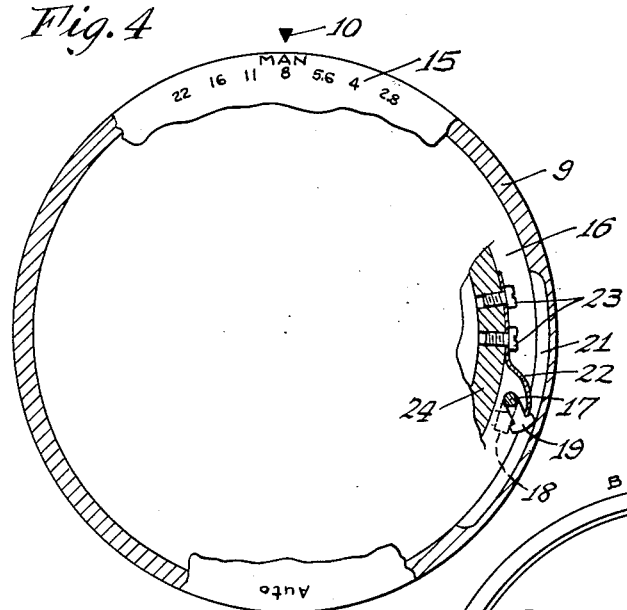
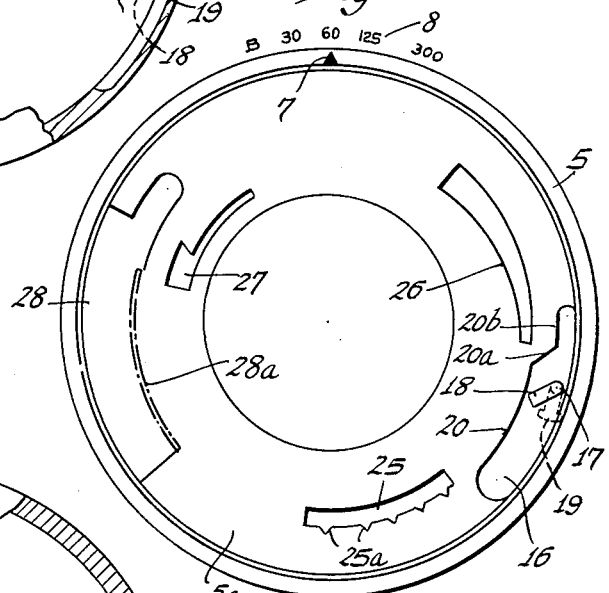
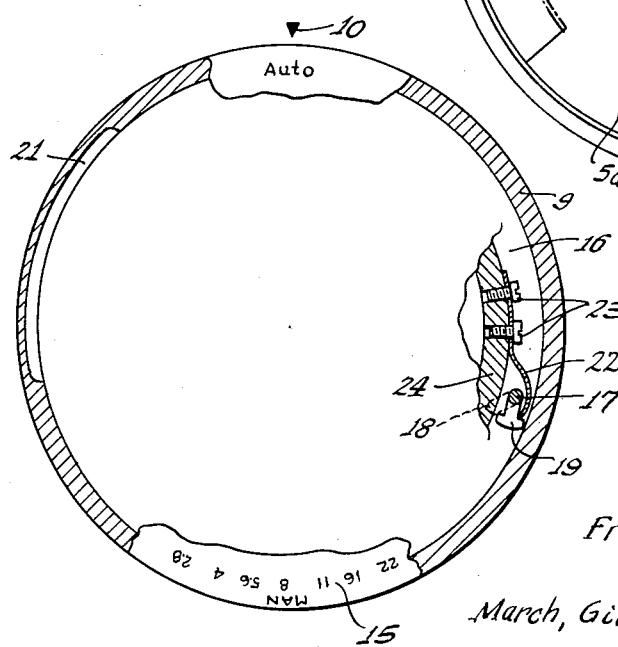

United States Patent Office 2,985,082
Patented May 23, 1961

2,985,082
PHOTOGRAPHIC CAMERA

Franz Wilhelm R. Starp, Calmbach (Enz), Germany, assignor to Alfred Gauthier, G.m.b.H., Calmbach (Enz), Germany, a corporation of Germany Filed Mar. 14, 1960, Ser. No. 14,799

Claims priority, application Germany Mar. 17, 1959

6 Claims. (Cl. 95—10)

This invention relates to photographic cameras of the type having automatic exposure regulation or setting means, such means including an exposure time or shutter speed setting member which can be placed in a number of snapshot settings of different speeds and also in a "B" setting, together with a diaphragm arranged to be automatically adjusted in response to light intensity values and correlated with preset values of shutter speed, film sensitivity and other exposure factors, the said camera also having a switching or selector means by which it may be switched from automatic to manual adjustment of the diaphragm, and vice versa.

It is an object of the invention to provide a novel and improved camera of the above type, which is characterized by an uncomplicated construction and an economy of manufacture while at the same time providing a maximum degree of simplicity, reliability and a desirable mobility from the operation and functional standpoints, to the end that defective photographs are avoided, both in the case of manual and in the case of automatic diaphragm regulation.

This is accomplished, in accordance with the invention, by the provision of a novel interlock means which is cooperable with the selector device and also with the speed setting member, said interlock means preventing the speed setting member from being shifted into the "B" position when the selector device is adjusted for effecting automatic regulation of the diaphragm, and said interlock means further effecting a locking of the selector device in the position thereof which provides for manual adjustment of the diaphragm (after the selector device has been shifted to such position), when the speed setting member is placed in the "B" position.

In contrast to known prior cameras, a camera as thus constructed in accordance with the invention is distinguished by an operation such that upon the selector device being placed in the position for effecting automatic regulation of the diaphragm, the settings of the speed setting member are restricted to the various, different snapshot settings and a "B" setting is not possible. On the other hand, when the speed setting member is able to be shifted to the "B" setting the selector device is locked in the position for effecting manual regulation of the diaphragm, and is prevented from being shifted to the setting position providing for automatic diaphragm regulation. The invention thus avoids, by the above arrangement of a reciprocally or alternate acting interlock means any possibility that automatic diaphragm regulation could occur simultaneously with a non-defined exposure time as results from a "B" setting. Thus, there is avoided the taking of defective photographs by virtue of this safety organization.

Simplicity in the handling of the camera, and an advantageous adaptability of the device to existing camera and diaphragm structures is obtained when the selector device is constituted as a ring arranged to be concentric with the optical axis of the camera, and when it is also adapted to constitute the diaphragm setting member at such times that it is placed in the position for effecting manual diaphragm adjustment.

A further uncomplicated and space-saving construction of the invention, which is characterized by short and direct connections between the interlock means and the selector device and speed setting member is obtained, where the camera is of the type employing an intra-lens shutter assemblage, by disposing the interlock means at the interior of the intra-lens shutter housing.

An interlock means as provided by the invention may be constructed in various advantageous ways. One desirable construction, both from the standpoint of functional reliability and also free mobility and adaptability to the structure of the shutter is obtainable with the above-mentioned construction and disposition of the interlock when such means is arranged to include a shaft which extends parallel to the shutter axis and is rotatably carried by a bearing member affixed to the shutter housing, the ends of such shaft being provided with fixedly attached locking or blocking levers one of which cooperates with the speed setting member whereas the other cooperates with the selector device.

For the purpose of effecting a simple, space-saving cooperation involving few components, between an arresting or block lever of the interlock means and the speed setting member, the latter is provided with a clearance slot which extends circumferentially a distance commensurate with the path of adjusting movement of the speed setting member, said slot being arranged to receive the said lever. One end portion of said slot, corresponding to the B-position of the setting member, is reduced in width or made narrower and has a width only slightly greater than the said lever, whereby the latter may be pivoted into alignment with, and may be received in the said narrow slot portion in response to shifting of the speed setting member to its "B" position. Such accommodation of the blocking lever in the narrow end portion of the slot may occur if the selector device is in the position wherein it effects manual adjustment of the diaphragm.

In an equally advantageous manner, the use of complicated operating devices can be avoided by providing a recess in the circumference of the selector device, for the purpose of locking the same in its "manual" setting when the speed setting member is adjusted to the "B" position. The said recess has a length which is commensurate with the length of the diaphragm adjusting range, and the lever which cooperates with the selector device may be received in the said recess when the device is in its manual setting, in response to adjustment of the speed setting member into the "B" position.

An embodiment of the invention is illustrated in the accompanying drawings, in which:

Fig. 1 is a top plan view of a photographic intra-lens shutter assemblage having a speed setting member and a selector device as provided by the invention, by means of which the camera can be changed from automatic to manual diaphragm settings and vice versa. The selector device is illustrated in the manual or non-automatic position. The speed setting member is shown as adjusted for obtaining "B" exposures.

Fig. 4 is a fragmentary vertical sectional view through the intra-lens shutter assemblage of Figs. 1 and 2, illustrating the selector device in the manual setting position of Fig. 1. This figure also illustrates a locking or blocking lever which is arranged for cooperation with the selector device and which constitutes a portion of the interlock means provided by the invention.

Fig. 5 is a view similar to that of Fig. 3, but illustrating the speed setting member in the position occupied in Fig. 2, for effecting a snapshot.

Fig. 6 is a view like that of Fig. 4, but illustrating the selector device as being adjusted to its automatic positon, as is also depicted in Fig. 2.

Figure 1:
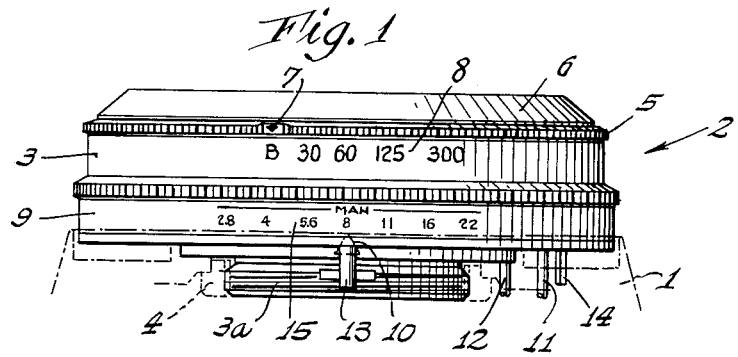
Figure 2:
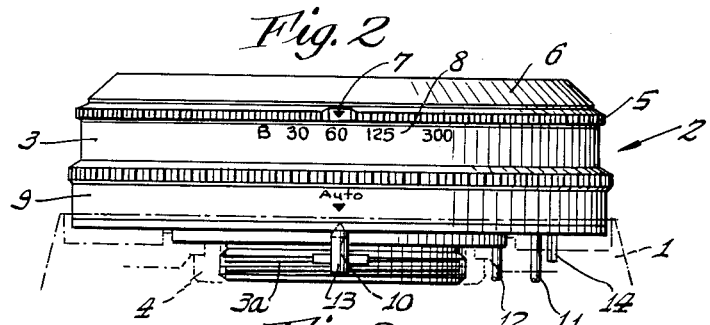
Fig. 2 is a view similar to that of Fig. 1 but showing the selector device in the automatic position, with the speed setting member adjusted to one of the snapshot speeds.
Figure 3:
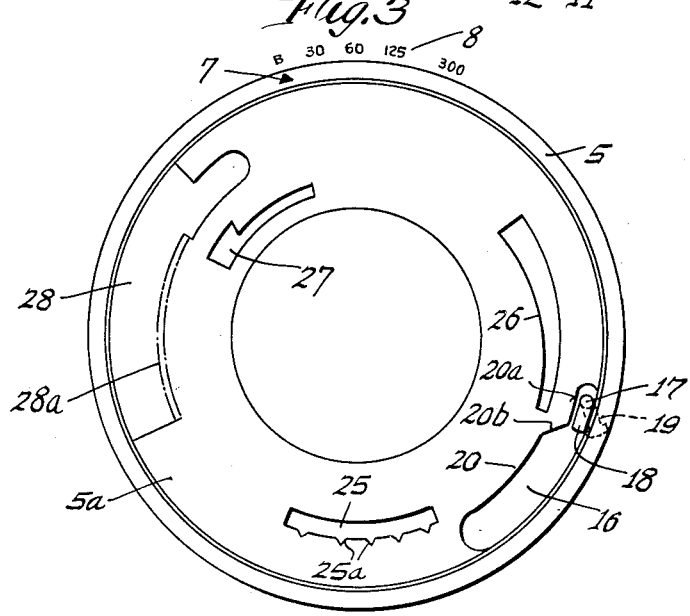
Fig. 3 is a front elevational view of the speed setting member utilized in the lens assemblage illustrated in Figs. 1 and 2. This figure also shows the arrangement and positioning of a locking or blocking lever constituting a portion of the interlocking means as provided by the invention.

Referring now to Figs. 1 and 2, the front portion or wall of the photographic camera is indicated by the numeral 1. Attached to the front wall 1 in a well known manner by means of a nozzle 3a is a photographic intra-lens shutter assemblage 2, said nozzle having the usual external screw threads and being provided on the rear of the shutter housing 3. The intra-lens shutter assemblage 2 is secured in place by means of a threaded ring 4 which is screwed onto the nozzle 3a.

On the front of the intra-lens shutter housing 3 there is provided an exposure time or shutter speed setting ring 5, said ring being retained in place by means of a front plate 6 in a well known manner. For the purpose of conveniently shifting the ring 5 it has the usual knurling. For setting purposes, the ring 5 has a setting or index mark 7 which cooperates with a speed scale 8 provided on the shutter housing 3.

The selector device, which enables the camera to be switched from automatic to manual diaphragm settings and vice versa, comprises a manually operable ring 9 which is rotatably carried on the rear of the intra-lens shutter assemblage 2.

In the illustrated embodiment of the invention as shown in Figs. 1 and 2, the two setting positions of the selector device are identified by the words "auto" and "man," said words being provided on the ring 9 and being referrable to a fixed setting mark 10 provided on the camera.

When the selector device 9 is in the automatic position as illustrated in Fig. 2, the diaphragm is arranged to be automatically regulated by means of an exposure regulating or setting device (not shown) whereas when the device 9 is in the manual position illustrated in Fig. 1 the diaphragm may be manually adjusted.

One type of camera employing a selector device by which either manual or automatic adjustment of the diaphragm may be optionally had, is illustrated and described in copending application Serial No. 861,917, filed December 24, 1959, and entitled Camera.

Devices for automatically setting the diaphragm in response to actuation of an exposure regulator as controlled by existing light conditions are well known in various performances and the invention does not relate to such devices. Suitable automatic diaphragm regulators are, for example, illustrated and described in copending applications Serial No. 837,910, filed September 3, 1959, and entitled Photographic Camera with Automatic Exposure Setting; and Serial No. 859,734, filed December 15, 1959, and entitled Photographic Camera with Automatic Exposure Regulator. With respect to the embodiment of the invention illustrated herein, a suitable automatic diaphragm regulator device might, for example, be constructed utilizing a rotatably adjustable moving coil system of a light intensity measuring device. Adjustment of such moving coil system could be effected by a shaft 11 projecting from the rear of the shutter housing 3, said shaft being connected to the speed setting ring 5 (for rotation thereby) through the intermediary of suitable gearing involving a gear wheel on the shaft. The adjustment of the diaphragm mechanism might be effected by a powered driving device which is under the control, as regards its positioning of a sensing member cooperable with the needle of the moving coil measuring device. The diaphragm setting, utilizing such powered driving device, might be effected by means of a shaft 12 which also projects from the rear of the shutter housing 3 and which is coupled to the diaphragm setting mechanism in any suitable manner.

A shaft 13 and an arm 14 projecting from the rear of the shutter assemblage 2 serve, in a well known manner, for cocking and releasing the shutter. The members 13 and 14 are connected, in a manner not shown in the drawings, to suitable actuating devices (also not shown) and which for example comprise the film transport device of the camera or the camera release mechanism.

In accordance with the present invention, in a camera of the above described type, interlock means are provided for preventing shifting of the selector device 9 into a setting position which effects automatic regulation of the diaphragm at such time that the speed setting ring 5 might be adjusted for obtaining "B" exposures. Also, the interlock means as thus provided by the invention maintains the speed setting member in the range provided for snapshots and prevents such member from being placed in the "B" exposure position at the time that the selector device 9 is in the automatic position. The said interlock means may be arranged to be cooperable with the setting ring 5 and also with the selector device 9. The action is such that the speed setting member 5 cannot be moved into the "B" position when the selector 9 is in the automatic diaphragm regulating position, and the means which blocks the speed setting member from the "B" position is rendered inoperative when the selector 9 is set at the position providing for manual diaphragm adjustment. Also, the selector device 9 is prevented from being shifted into the setting position which effects automatic diaphragm adjustment whenever the speed setting member is in the "B" position.

By this organization the operational simplicity and reliability of the camera is enhanced, and a common cause of defective photographs is eliminated.

As already mentioned above, and as illustrated in Figs. 1 and 2, the selector device 9 is constructed, in accordance with the invention, in the form of a ring which is arranged to be concentric with the optical axis of the lens assemblage. The said ring also serves as a diaphragm setting member when it is in the setting position (marked "man") which effects manual adjustment of the diaphragm. Such organization results in an important saving of space, considering the overall structure of the camera. It also produces the additional advantage, with respect to the operation of the camera, that no special or additional setting member is required for regulating the diaphragm when the camera is adjusted for manual diaphragm settings. Instead, the manual adjustment of the diaphragm is effected by an adjustable positioning of the selector ring 9, which thus serves a double purpose. The number of manipulations is thereby reduced to an absolute minimum.

For the purpose of setting the diaphragm, the selector device 9 has a diaphragm scale 15 carrying the symbol "man" which is referable to the aforementioned fixed setting or index mark 10.

In order to insure a reliable mode of operation of the diaphragm for both the manual and automatic settings of the camera, the cooperation between the selector device 9 and the diaphragm adjusting mechanism provides that, when the selector is at the automatic setting, the diaphragm is set at an opening or aperture value (at the start of the exposure at the very latest) which is, for example, defined by engagement between the sensing member of the measuring mechanism and the needle or deflectable part of such measuring mechanism. On the other hand, in the manual position or setting of the camera the diaphragm is shifted in the same manner as well known preselection spring diaphragms, from one of its two setting positions by means of spring action to the aperture value preselected on the scale 15, this occurring after the shutter release has been actuated but before the actual start of the exposure. For this purpose, a stop which is not shown herein, is provided on the selector 9, said stop cooperating with a counter stop (also not shown) provided on the diaphragm adjusting ring.

As is apparent from Figs. 3–6, the interlock means of the illustrated embodiment is provided in the interior of the intra-lens shutter assemblage 2. This produces the most direct, shortest possible transmission path between the setting members 5 and 9. In addition, it insures a compact structure of the shutter, and a closed exterior arrangement of the camera. The disposition of the interlock means in the interior of the shutter provides the additional advantage of increased reliability and convenience of operation, since the operator is able to adjust or set the camera or shutter without being obstructed by locking members located outside of the shutter assemblage or the camera.

In accordance with the invention, the interlock means comprises a shaft 17 which extends parallel to the shutter axis and is rotatably carried in a bearing member 16 affixed to the shutter housing 3. At the end of the shaft 17 locking or blocking levers 18, 19 are affixed, the lever 18 cooperating with a speed setting member 5 whereas the lever 19 cooperates with the selector ring 9.

For this purpose, there is provided by the invention an arcuate slot 20 in the speed setting member 5, said slot extending circumferentially to an extent equal to the adjusting range of the setting member. The slot 20 accommodates or receives the locking lever 18 and at one end, which corresponds to the "B" position it is reduced in width or made narrower, such portion being indicated by the numeral 20a. The width of the narrow portion 20a of the slot 20 is slightly greater than the width of the lever 18 so that the latter can be received in such portion when it is aligned therewith. Such alignment can be effected by suitable pivotal movement of the blocking lever, as is effected in response to shifting of the speed setting member 5 to the "B" position. This pivotal movement of the lever 18 is possible if the selector member 9 is in its manual setting, which provides for manual adjustment of the diaphragm. For the purpose of establishing a cooperable relationship between the blocking lever 19 and the annular selector device 9, a recess 21 is provided on the periphery of the member 9, the length of such recess corresponding to the length of the diaphragm adjusting range. The blocking lever 19 is shiftable into the said recess 21 in response to movement of the speed setting member 5 into the "B" position, and of course for such condition the selector member 9 is required to be set for manual adjustment of the diaphragm.

As is apparent from Figs. 4 and 6, the blocking levers 18 and 19 are acted on by a leaf spring 22 which is secured by means of screws 23 to a member 24 affixed on the shutter housing. The spring 22 tends to maintain the levers 18 and 19 in the positions shown in Figs. 5 and 6.

In order to releasably hold the speed setting member 5 in its respective setting positions against unintentional dislodgment therefrom, a recess 25 having notches 25a is provided on a disc shaped portion 5a of the setting member 5. The notches 25a cooperate with a detent device of well known construction, which is not shown in the drawings. The different instantaneous exposures or snapshot times are set, in a manner known per se, by means of a cam 26 which cooperates with an adjusting member (not shown) of a well known exposure time escapement mechanism.

In addition to the aforementioned recesses or openings, two additional recesses are provided in the disc shaped portion 5a of the speed setting member 5, one of which, indicated at 27, cooperates with an arm (not shown) of a well known device for carrying out the "B" exposures. The other recess 28 has a toothed edge 28a which meshes with a pinion (not shown) affixed to the shaft 11 which projects from the rear portion of the shutter housing 3.

The interlocking means as provided by the invention operates as follows:

(1) *Effecting an exposure with automatic exposure setting*

The operator first sets the selector member 9 to the automatic position. This locates the recess 21 remote from or out of the range of the arresting or blocking lever 19, which latter is now secured against pivotal movement by engagement with the inner peripheral surface of the member 9 and the outer periphery of the member 24 is affixed to the shutter housing 3 (Fig. 6). The locking lever 18 which is connected to the lever 19 by means of the shaft 17 now occupies the position shown in Fig. 5, which permits adjustment of the speed setting member 5 of the portion of large width only in the region of the recess 20, which portion is associated exclusively with the instantaneous exposure or snapshot speeds. The lever 18 counteracts any attempt to shift the setting ring 5 to the "B" setting, since the lever is engageable with a stop or detent edge 20b provided on the recess 20 at the snapshot setting position which is closest to the "B" position, illustrated in the present embodiment of the invention as a shutter speed of 1/30 sec. Such engagement of the lever 18 makes further adjustment in this direction of the speed setting member 5 impossible while the selector member 9 is in the automatic position.

(2) *Effecting an exposure with manual adjustment of the diaphragm*

The selector member 9 is moved from the automatic position to the manual position. The recess 21 of such member is now located adjacent the arresting lever 19. When the speed setting member 5 is set at the "B" position, the locking lever 18 is pivoted into and confined by the narrow slot portion 20a, and the blocking lever 19 is as a consequence shifted into the recess 21 in the selector member 9, against the action of the spring 22 which acts on the lever 19. Since the recess 21 extends only over the length of the diaphragm adjusting range, the blocking lever 19, as may be understood from an inspection of Fig. 4 is engageable with the ends of the recess 21 when the member 9 is shifted to the end positions of its diaphragm adjusting range. Consequently, it becomes impossible to shift the selector 9 into its automatic exposure setting as long as the blocking lever 18 is held against pivoting by virtue of such lever occupying the narrow slot portion 20a of the speed setting member 5. Only when the speed setting member 5 is set for one of the snapshot exposures included in the scale 8 is the spring 22 able to become operative to pivot the arresting levers 18 and 19 back to the positions shown in Figs. 5 and 6.

Irrespective of the different embodiments to which the present invention may lend itself and irrespective of the kind of camera or kind of intra-lens shutter assemblage in connection with which the invention is put into effect, the advantages obtained by the provision of the present interlock means as provided by the invention may be fully realized. Such advantages result from locking the speed setting member against movement into its "B" position whenever the selector device is in its automatic setting, and conversely locking the selector member against being shifted into its automatic position whenever the speed setting member is in the "B" position.

I claim:

1. In a photographic camera of the type having an adjustable diaphragm and adjustable shutter speed, and having automatic exposure regulation by which the diaphragm can be automatically set in response to light values and can be coordinated with various shutter speeds, in combination, a manually-operable speed setting member which is settable in a number of different snapshot settings and also in a "B" setting; means including a manually operable selector device for optionally effecting regulation of the diaphragm either automatically in response to said light values or else manually; and an interlock means cooperable with said speed setting member and selector device, blocking movement of the setting member to its "B" position when the selector device is adjusted to provide automatic diaphragm regulation; said means enabling movement of the setting member to "B" position when the selector device is adjusted to provide manual regulation of the diaphragm, said interlock means blocking movement of the selector device to the position for effecting automatic diaphragm adjustment when the setting member is in the said "B" position.

2. The invention as defined in claim 1, in which the selector device comprises a ring arranged concentrically with respect to the optical axis, said ring constituting the diaphragm setting member when the device effects manual adjustment of the diaphragm.

3. The invention as defined in claim 1, in which the camera has an intra-lens shutter assemblage including a shutter housing, and in which the interlock means is disposed in said shutter housing.

4. The invention as defined in claim 3, in which the interlock means includes a shaft disposed parallel to the shutter axis, in which there is a bearing member for said shaft, carried by the shutter housing, in which the interlock means includes blocking levers affixed to the ends of the shaft, one of said levers cooperating with the speed setting member and the other cooperating with the selector device.

5. The invention as defined in claim 4, in which the speed setting member has a circumferentially extending slot the length of which is commensurate with the adjusting range of the member, said slot accommodating the said one lever and at one end being narrowed and having a width commensurate with the width of said lever whereby the latter may be pivoted and made to occupy said narrowed portion when the setting member is shifted to advance the narrowed slot end on the lever while the selector ring is adjusted for manual diaphragm regulation.

6. The invention as defined in claim 4, in which the selector ring has on its circumference a circumferentially extending recess the length of which is commensurate with the adjusting range of the diaphragm, the said other lever being swingable into said recess in response to shifting of the speed setting member into the "B" position while the selector ring is set for manual diaphragm adjustment.

References Cited in the file of this patent

UNITED STATES PATENTS

| | | |
|---|---|---|
| 2,841,064 | Bagby et al. | July 1, 1958 |
| 2,935,921 | Rentschler | May 10, 1960 |
| 2,891,457 | Schwahn | June 23, 1959 |
| 2,938,446 | Singer | May 31, 1960 |